(12) United States Patent
Jeong et al.

(10) Patent No.: US 8,903,160 B2
(45) Date of Patent: Dec. 2, 2014

(54) APPARATUS AND METHOD WITH TRAVELING PATH PLANNING

(75) Inventors: Woo-Yeon Jeong, Seoul (KR); Jun-Ho Park, Hwaseong-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 852 days.

(21) Appl. No.: 12/926,526

(22) Filed: Nov. 23, 2010

(65) Prior Publication Data

US 2011/0194755 A1 Aug. 11, 2011

(30) Foreign Application Priority Data

Feb. 5, 2010 (KR) .......................... 10-2010-0011094

(51) Int. Cl.
  *G06K 9/00* (2006.01)
  *G06T 7/00* (2006.01)
  *G05D 1/02* (2006.01)

(52) U.S. Cl.
  CPC .......... *G06K 9/00791* (2013.01); *G06T 7/0042* (2013.01); *G05D 1/0272* (2013.01); *G05D 1/0246* (2013.01); *G06T 2207/10016* (2013.01); *G06T 2207/30252* (2013.01); *G06T 7/0048* (2013.01); *G05D 2201/0203* (2013.01); *G05D 1/0219* (2013.01)
  USPC ............................ 382/153; 382/193; 382/190

(58) Field of Classification Search
  USPC ......... 382/153, 181–199, 203, 209, 217, 264; 235/454; 700/258, 259; 901/1
  See application file for complete search history.

(56) References Cited

U.S. PATENT DOCUMENTS

| | | | |
|---|---|---|---|
| 4,870,597 A | 9/1989 | Seki et al. | |
| 5,065,344 A | 11/1991 | Kishimoto et al. | |
| 6,025,790 A * | 2/2000 | Saneyoshi | 340/946 |
| 6,028,673 A | 2/2000 | Nagasaki et al. | |
| 6,496,754 B2 | 12/2002 | Song et al. | |
| 7,162,056 B2 * | 1/2007 | Burl et al. | 382/104 |
| 7,184,586 B2 * | 2/2007 | Jeon et al. | 382/153 |
| 7,283,888 B2 * | 10/2007 | Evans et al. | 700/186 |
| 7,869,942 B2 * | 1/2011 | Naito et al. | 701/424 |

(Continued)

FOREIGN PATENT DOCUMENTS

| | | |
|---|---|---|
| JP | 11-287627 | 10/1999 |
| KR | 88-700343 | 2/1988 |
| KR | 89-5629 | 5/1989 |

OTHER PUBLICATIONS

Miura et al. "Vision Motion Planning of a Mobile Robot Considering Vision Uncertainty and Planning Cost" (1999) Planning and Scheduling, pp. 1-7.*

(Continued)

*Primary Examiner* — Chan Park
*Assistant Examiner* — Mia M Thomas
(74) *Attorney, Agent, or Firm* — Staas & Halsey LLP

(57) ABSTRACT

An apparatus and method of planning a traveling path of a mobile robot, the apparatus and method including a pattern extracting unit, a pattern direction extracting unit, and a path generating unit. The pattern extracting unit may extract at least one pattern from an image of a ceiling captured in a ceiling direction. The pattern direction extracting unit may extract a pattern direction of the image in the form of a line from the at least one extracted pattern. The path generating unit may generate a traveling path of the mobile robot based on the extracted pattern direction.

28 Claims, 7 Drawing Sheets

(56) References Cited

U.S. PATENT DOCUMENTS

| | | | |
|---|---|---|---|
| 8,023,727 B2* | 9/2011 | Matsumoto et al. | 382/154 |
| 8,027,273 B2* | 9/2011 | Nguyen | 370/254 |
| 8,027,515 B2* | 9/2011 | Lee et al. | 382/103 |
| 8,331,652 B2* | 12/2012 | Yoon et al. | 382/153 |
| 8,340,901 B2* | 12/2012 | Fahn et al. | 701/431 |
| 8,379,966 B2* | 2/2013 | Jeong et al. | 382/153 |
| 8,380,384 B2* | 2/2013 | Lee et al. | 701/28 |
| 8,634,596 B2* | 1/2014 | Bedros et al. | 382/115 |
| 2002/0051128 A1* | 5/2002 | Aoyama | 356/4.03 |
| 2002/0091466 A1* | 7/2002 | Song et al. | 700/245 |
| 2002/0169537 A1* | 11/2002 | Regensburger et al. | 701/96 |
| 2004/0088080 A1* | 5/2004 | Song et al. | 700/259 |
| 2004/0156541 A1* | 8/2004 | Jeon et al. | 382/153 |
| 2005/0159841 A1* | 7/2005 | Yasukawa et al. | 700/245 |
| 2005/0165508 A1* | 7/2005 | Kanda et al. | 700/245 |
| 2005/0171644 A1* | 8/2005 | Tani | 700/253 |
| 2005/0182520 A1* | 8/2005 | Takamura et al. | 700/259 |
| 2006/0111841 A1* | 5/2006 | Tseng | 701/301 |
| 2007/0058838 A1* | 3/2007 | Taniguchi | 382/103 |
| 2008/0310682 A1* | 12/2008 | Lee et al. | 382/106 |
| 2009/0185755 A1* | 7/2009 | Cho et al. | 382/264 |
| 2009/0226113 A1* | 9/2009 | Matsumoto et al. | 382/284 |
| 2011/0054691 A1* | 3/2011 | Lee et al. | 700/259 |
| 2012/0242473 A1* | 9/2012 | Choi | 340/441 |

OTHER PUBLICATIONS

Melchior et al. "Consideration of Obstacle Danger Level in Path Planning using A and Fast Marching Optimization: Comparative Study" Signal Processing 83 (2003) pp. 2387-2396.*

* cited by examiner

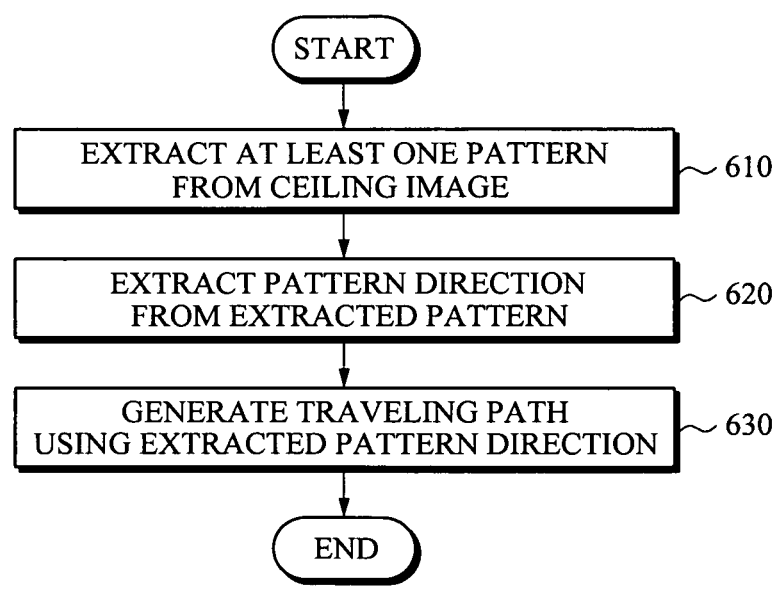

APPARATUS AND METHOD WITH TRAVELING PATH PLANNING

CROSS-REFERENCE TO RELATED APPLICATIONS

This application claims the benefit under 35 U.S.C. §119(a) of a Korean Patent Application No. 10-2010-0011094, filed on Feb. 5, 2010, the entire disclosure of which is incorporated herein by reference for all purposes.

BACKGROUND

1. Field

One or more embodiments relate to a mobile robot, and more particularly, to an apparatus and method planning a traveling path of a mobile robot.

2. Description of the Related Art

A typical primary function of a mobile machine, such as an autonomous mobile robot, is to arrive at a target without collision. To this end, localization and mapping techniques have been adopted in autonomous mobile robots. A simultaneous location and mapping (SLAM) algorithm may be used for the localization and mapping techniques. A SLAM algorithm allows a mobile robot to build up a map of its surroundings while at the same time keeping track of its current location based on the created map.

A mobile robot generally measures a distance using a laser scanner and an odometer, for example. However, in the course of executing SLAM algorithms, numerous errors due to various unpredicted variables such as a feature point extraction error, an unknown odometry error, a camera geometry error, and the like, may accumulate, resulting in inaccurate position and/or travel path settings.

SUMMARY

In one general aspect, provided is an apparatus planning a traveling path of a mobile robot, the apparatus including a pattern extracting unit, a pattern direction extracting unit, and a path generating unit. The pattern extracting unit may extract at least one pattern from an image of a ceiling captured in a ceiling direction. The pattern direction extracting unit may extract a pattern direction of the image in the form of a line from the at least one extracted pattern. The path generating unit may generate a traveling path of the mobile robot based on the extracted pattern direction.

The at least one pattern may include at least one of a line, a circle, and a quadrangle. The line forming the pattern direction of the image may be a straight line.

When the at least one pattern includes a line and a plurality of lines are extracted, the pattern direction extracting unit may disregard extracted lines, of the plurality of extracted lines, that are determined to not appear to be in a determined same plane as the ceiling, from consideration for the extraction of the pattern direction of the image, and extract a direction from extracted lines, of the plurality of extracted lines, that are determined to appear to be in the determined same plane as the ceiling, as the pattern direction When a plurality of extracted lines are determined to appear to be in the determined same plane as the ceiling, the pattern direction extracting unit may respectively group together extracted lines arranged in same directions and extract a direction of a group including a greatest number of extracted lines as the pattern direction.

The pattern extracting unit may extract a plurality of repeated patterns from the ceiling image and the pattern direction extracting unit may extract a direction of a line extrapolated from the repeated patterns as the pattern direction.

The path generating unit may generate a first traveling path using position information of the mobile robot, and adjust the generated first traveling path by changing the direction of the first traveling path to be identical to the pattern direction when a direction of the first traveling path is determined to not be identical with the extracted pattern direction.

The pattern direction extracting unit may further extract a perpendicular pattern direction perpendicular to the pattern direction, and the path generating unit may use at least one of the pattern direction and the perpendicular pattern direction to generate the traveling path.

The path generating unit may generate a zigzag path including a first traveling path in a first direction and a second traveling path in a second direction such that the first direction or the second direction is parallel to the extracted pattern direction and when the mobile robot moves along the zigzag path, the mobile robot may move along the first traveling path in the first direction until encountering an obstacle, change direction and move a predetermined distance relative to the obstacle, then change direction to the second traveling direction which is opposite to the first traveling direction and move in the second traveling direction until encountering another obstacle.

In another general aspect, provided is a method planning a traveling path of a mobile robot, the method including extracting at least one pattern from an image of a ceiling captured in a ceiling direction, extracting a pattern direction of the image in the form of a line from the at least one extracted pattern, and generating a traveling path of the mobile robot based on the extracted pattern direction.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 6 is a flowchart of a method planning a traveling path, according to one or more embodiments.

DETAILED DESCRIPTION

Figure 1:
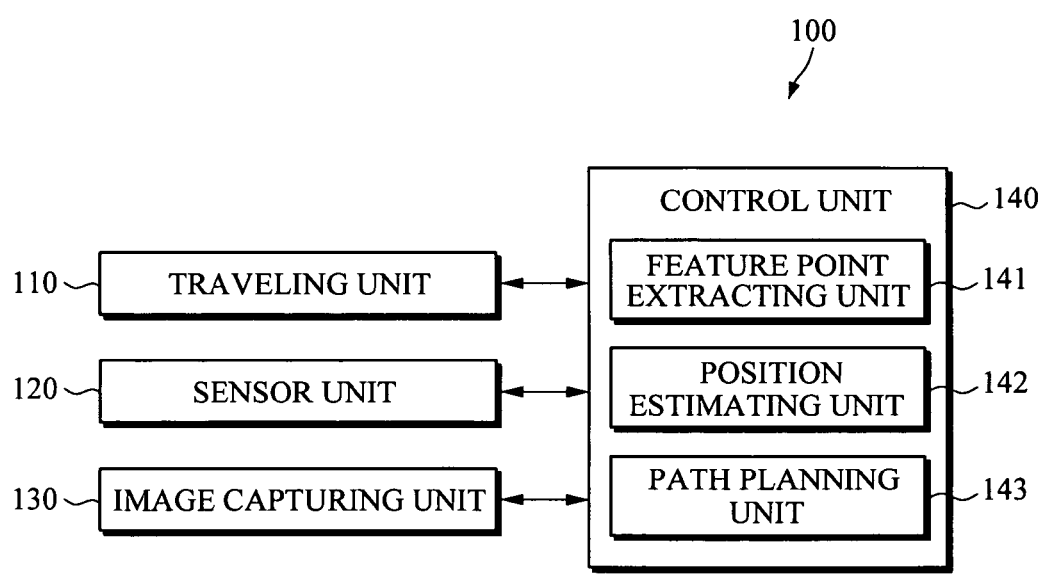
FIG. 1 is a diagram illustrating an apparatus planning a traveling path, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an apparatus planning a traveling path, according to one or more embodiments. Referring to FIG. 1, the apparatus 100 may include a traveling unit 110, a sensor unit 120, an image capturing unit 130, and a control unit 140, for example. The apparatus 100 may be implemented as a mobile robot that can move while capturing an image, and in one or more embodiments, be a robot apparatus or method with traveling path planning of the mobile robot. Hereinafter, the apparatus 100 will be described under an assumption that the apparatus 100 is a mobile robot, noting that embodiments are not limited to the apparatus 100 being a mobile robot.

The traveling unit 110 may include traveling element(s), such as a plurality of wheels, and a driving source for providing a driving force to the traveling element(s).

The sensor unit 120 may be mounted on the mobile robot 100 to detect movement and rotation of the mobile robot 100. To this end, the sensor unit 120 may include an encoder or a gyrosensor, as only examples. The gyrosensor may detect an angle at which the mobile robot 100 has actually rotated. The encoder may recognize a path along which the mobile robot 100 has actually moved, e.g., by interfacing with the traveling element(s) to determine a path actually followed rather than an intended path. In detail, a directional angle and a position of the mobile robot 100 in two-dimensional coordinates may be estimated by the encoder integrating an actual direction and an actual distance of movement of the mobile robot 100. Generally, the encoder can obtain reasonably accurate estimation results, but errors may accumulate over time, as the integration is continuously performed. The sensor unit 120 may include an infrared, laser, or ultrasonic sensor to obtain obstacle detection information used for building up an obstacle map, noting that additional and/or alternative sensing elements are equally available.

The image capturing unit 130 may capture an external image and convert the image into a digital signal. The image capturing unit 130 may be configured to include a charge coupled device (CCD) module or a complementary metal oxide semiconductor (CMOS) module, as only an example, again noting that additional and/or alternative image capturing elements are equally available. The image capturing unit 130 may obtain a ceiling image by capturing an image in a direction perpendicular to a plane in which the mobile robot 100 travels, for example.

The control unit 140 may control one or more overall operations of the apparatus 100, that is, the mobile robot. The control unit 140 may include a feature point extracting unit 141, a position estimating unit 142, and a path planning unit 143, for example.

The feature point extracting unit 141 may extract a feature point from the ceiling image obtained by the image capturing unit 130. The feature point refers to a point such as an edge or a corner which can specify a shape of an object. The feature point may be referred to as a landmark based on which a feature point map can be built. In addition, the feature point may be a line or point extracted from an outline of a closed region. For example, a line or point may be extracted as the feature point from a circular or quadrangular outline of an object such as a light in the ceiling image. A quadrangular outline is an outline of a shape made up of at least four angles and at least four straight sides. For example, a rectangle or a square may each form quadrangular outlines.

The position estimating unit 142 may estimate a position of the mobile robot 100 based on the starting location and a directional angle of movement of the mobile robot 100. The estimation of the position of the mobile robot 100 may refer to estimation of a position and a directional angle of the mobile robot 100 in a two-dimensional plane. A reference for a position of the mobile robot 100 may be a feature point present on a map. Thus, position information of the mobile robot 100 may include a position and a directional angle of the mobile robot 100 with reference to the feature point recognized by the mobile robot 100, for example.

The position estimating unit 142 may estimate a position in comprehensive consideration of pieces of information about odometry (odometer information), angular velocity, and acceleration which are obtained from the traveling unit 110 and the sensor unit 120, for example, and feature point information obtained by the feature point extracting unit 141.

Furthermore, the position estimating unit 142 may perform a SLAM algorithm to recognize a position of the mobile robot 100 and simultaneously build up a map. The SLAM algorithm enables a mobile robot to build up a map of surroundings where the mobile robot is located while at the same time tracking its current location based on the built map. The position estimating unit 142 may estimate a current position based on an obstacle map or the ceiling map, and may be configured in various ways as long as it may simultaneously perform position-recognition and map building.

Specifically, the position estimating unit 142 may create a feature map including feature points extracted from the ceiling image obtained by the image capturing unit 130 and feature point descriptors that identify the respective feature points. Here, each of the feature descriptors may be a local image of each feature point, or directional information or vector information of the image. The position estimating unit 142 may use various feature extraction algorithms including a scale-invariant feature transform scheme, a Harris corner detector scheme, and the like to create the feature points and the feature point descriptors, noting that alternative feature transformation schemes are equally available.

Additionally, as only an example, the position estimating unit 142 may use a Monte-Carlo localization method to recognize a current position. In Monte-Carlo localization, potential positions of a mobile robot are determined on a given map, the probability that the mobile robot is located at each of these potential positions is represented as a particle with a weight applied thereon, and at least one position with the higher or highest probability is determined as being the current position. The position estimating unit 142 may use characteristics of the extracted feature points to calculate a position and a direction of the mobile robot 100, that is, a weight applied to each posture of the mobile robot 100, and estimate the optimal posture based on the calculated weight. Here, the weight refers to a value that increases as the posture estimation becomes more accurate.

The path planning unit 143 may generate a path using position information of the mobile robot 100 obtained by the position estimating unit 142. In addition, the path planning unit 143 may extract an inherent direction of a space where the mobile robot 100 travels, and generate the path for the mobile robot 100 to move in a direction parallel to or perpendicular to the extracted inherent direction. In this case, a space where the mobile robot 100 travels may be generally quadrangular, and thus the inherent direction may be along one of the outlining quadrangular lines defining the space, or be a longitudinal or perpendicular direction of the space.

The path planning unit 143 may extract at least one pattern previously determined from the ceiling image and extract a linear pattern direction from the extracted pattern in order to detect the inherent direction of the space where the mobile robot 100 travels. The predetermined patterns extracted from the ceiling image may include lines, circles, and rectangles, as only examples.

Then the path planning unit 143 may use the extracted pattern direction to generate a traveling path. In addition, the path planning unit 143 may be configured to control the traveling unit 110 to move along the generated traveling path.

The mobile robot 110 may further include other elements. For example, the mobile robot 100 may be configured to perform an additional task such as cleaning while moving. If the mobile robot 100 is implemented as a cleaning robot, the mobile robot 100 may further include an additional module for removing debris through air suction or the like from a space where the mobile robot 100 is located. Similarly, if the mobile robot 100 is implemented for different purposes, e.g., other than cleaning, such other related operations may be implemented through additional and/or alternative modules included or attached to the mobile robot 100.

Figure 2A:
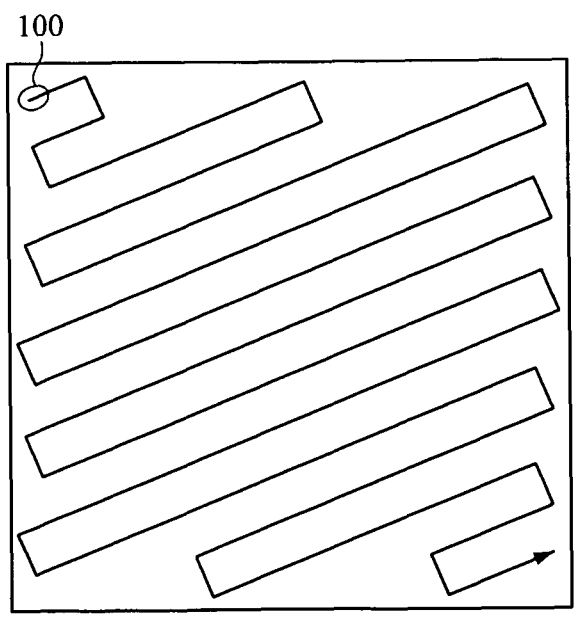
FIG. 2A is a diagram illustrating a general traveling path of a mobile robot, according to one or more embodiments.
Figure 2B:
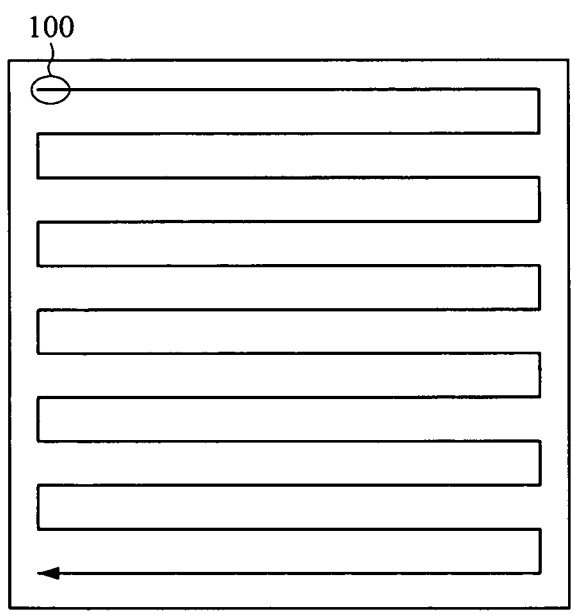
FIG. 2B is a diagram illustrating a planned traveling path of the mobile robot, according to one or more embodiments.

FIG. 2A illustrates a general traveling path of a mobile robot, according to one or more embodiments. FIG. 2B illustrates a planned traveling path of the mobile robot, according to one or more embodiments.

A mobile robot 100 may be controlled to travel in a zigzag manner. According to a zigzag pattern of movement, the mobile robot 100 may move along a first traveling path in a straight line until encountering an obstacle, then change directions due to the obstacle, move a specific distance along the periphery of the obstacle, then change directions to a direction of a second traveling path which is opposite to the direction of the first traveling path, and then travel along the second traveling path until another obstacle is encountered. The obstacles may merely be the aforementioned outlining quadrangular lines defining the space shown in FIG. 2A, or other obstacles within the space. In one or more embodiments, by repeating such movement and changes in direction, the mobile robot 100 may travel in a zigzag manner.

However, if the mobile robot 100 travels as shown in FIG. 2A according to only an initial posture of the mobile robot 100, e.g., without considering the inherent direction of the space, a user may feel uncomfortable since the mobile robot 100 may appear to move in an irregular pattern. Furthermore, if the mobile robot 100 is performing an additional task such as cleaning while moving as shown in FIG. 2A, the performance efficiency may be impaired.

In one or more embodiments, the mobile robot 100 may create a path along a direction perpendicular to the inherent direction of the space, and travel along the created path, as shown in FIG. 2B. Hence, the performance efficiency of the mobile robot 100 during performing a task such as cleaning can be improved and the user may feel the motion of the mobile robot 100 is more natural. For example, when a user places the mobile robot 100 facing an arbitrary direction and starts operating the mobile robot 100, the mobile robot 100 may detect the inherent direction of the space, where the mobile robot 100 moves around along the inherent direction, adjust its posture such that a traveling direction can be the same as the inherent direction of the space, and start traveling along the inherent direction.

Figure 3:
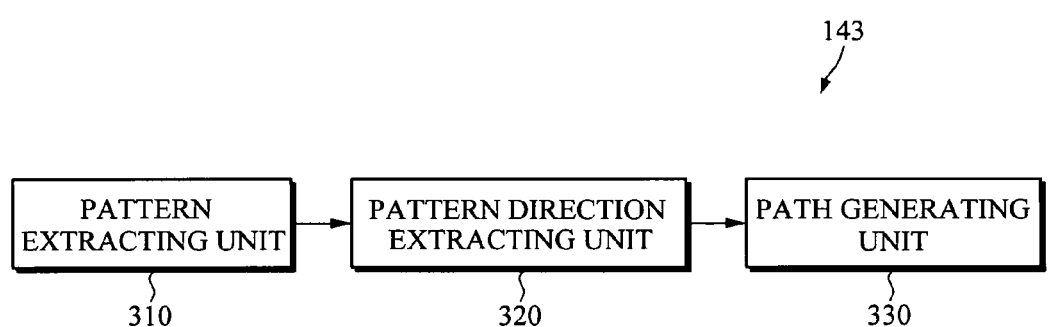
FIG. 3 is a diagram illustrating a path planning unit, such as of the traveling path planning apparatus of FIG. 1, according to one or more embodiments.

FIG. 3 illustrates a path planning unit, such as the path planning unit 143 of the traveling path planning apparatus of FIG. 1, according to one or more embodiments.

The path planning unit 143 may include a pattern extracting unit 310, a pattern direction extracting unit 320, and a path generating unit 330, for example.

The pattern extracting unit 310 may extract at least one of select patterns from the ceiling image obtained by capturing a region around the ceiling of a space where the mobile robot 100 travels. At least one of the select patterns may be a line, a circle, or a rectangle, for example. Additionally, the pattern extracting unit 310 may extract a plurality of repeated patterns from the ceiling image.

The pattern direction extracting unit 320 may extract a pattern direction in a form of a line from an extracted pattern. If a select pattern is a line and the pattern direction extracting unit 320 extracts a plurality of lines from the ceiling image, the pattern direction may eliminate lines which appear to not be in the same plane as the ceiling from the extracted lines to extract lines which are in the same plane as the ceiling in order to determine a pattern direction. In this case, the lines which appear to not be in the same plane may be perpendicular to the ceiling, such as vertical lines on the wall(s). Rather, lines which are in the same plane or at least appear to be in the same plane may be parallel to the ceiling. For example, wallpaper, patterns, and decorations of a given space are generally placed along the inherent direction of the space, and thus among the lines extracted from the ceiling image, such lines which appear to be in the same plane as the ceiling may be used to determine the inherent direction of the space. However, a line which appears to extend toward the ceiling (i.e. along a wall adjacent to the ceiling) may be considered irrelevant to the inherent direction of the space. Therefore, patterns on a pillar or the wall may be determined as lines which are not in the plane of the ceiling, and thus can be disregarded.

The pattern direction extracting unit 320 may use an optical center to determine lines which appear to be in the same plane as the ceiling. The optical center refers to a point at which a beam of light which is incident diagonally toward an axis of a lens intersects the lens axis in the lens. The optical center may be an x-axis position value and a y-axis position value of a two-dimensional plane defined by an x-axis and a y-axis which are determined by the disposition of an image sensor such as a CCD and a lens in the image capturing unit 130, for example. The position of the optical center may be determined to be constant in the ceiling image.

By using the fact that a line which is not in the same plane as the ceiling extends toward the optical center of the ceiling image, but does not pass over an optical center area, a line which is in a plane which is not the same as the plane of the ceiling may be determined from the ceiling image. The optical center area may be an area of a predetermined size which includes the optical center and thus can be regarded as an optical center in consideration of inherent errors.

Hence, the pattern direction extracting unit 320 is capable of recognizing a line of the ceiling image that extends toward the optical center area but does not pass over the optical center area as a line which is not in the same plane as the ceiling.

In addition, in the case of extracting a plurality of lines which appear to be in the same plane to the ceiling, the pattern direction extracting unit 320 may group together lines extending in the same direction, and determine a direction of the group that includes the most lines as the pattern direction.

In the case of extracting repeated patterns, the pattern direction extracting unit 320 may extract a pattern direction in the form of line which is made by the arrangement of the repeated patterns. Generally, fluorescent lamps, circular lights, and ceiling tiles are arranged along the inherent direction of a space, and thus from the repeated patterns extracted from the ceiling image, the inherent direction of the space may also be inferred.

The pattern direction extracting unit 320 may determine a perpendicular pattern direction that is perpendicular to a straight pattern direction. The perpendicular pattern direction may be inferred from the extracted pattern, or determined by performing calculation using the extracted pattern direction.

The path generating unit 330 may use the extracted pattern direction to generate a traveling path. Additionally, the path generating unit 330 may use at least one of the pattern direction and the perpendicular pattern direction to generate the traveling path.

The path generating unit 330 may generate a first traveling path using the position information of the mobile robot 100, and determine whether the first traveling path is equal or similar to the extracted straight direction. If the first traveling path is not equal to the extracted straight direction, the path generating unit 330 may change the first traveling path to be the same as or similar to the extracted straight direction. Moreover, the path generating unit 330 may generate a zigzag path including a first traveling path in a first direction and a second traveling path in a second direction such that the first direction or the second direction is parallel to the extracted pattern direction or the perpendicular pattern direction. When the mobile robot 100 moves along the zigzag path, the mobile robot 100 may move along the first traveling path in the first direction until encountering an obstacle, change directions and move a specific distance along the periphery of the obstacle, then change directions to the second traveling direction which is opposite to the first traveling direction and move in the second traveling direction until another obstacle is encountered.

Figure 4:
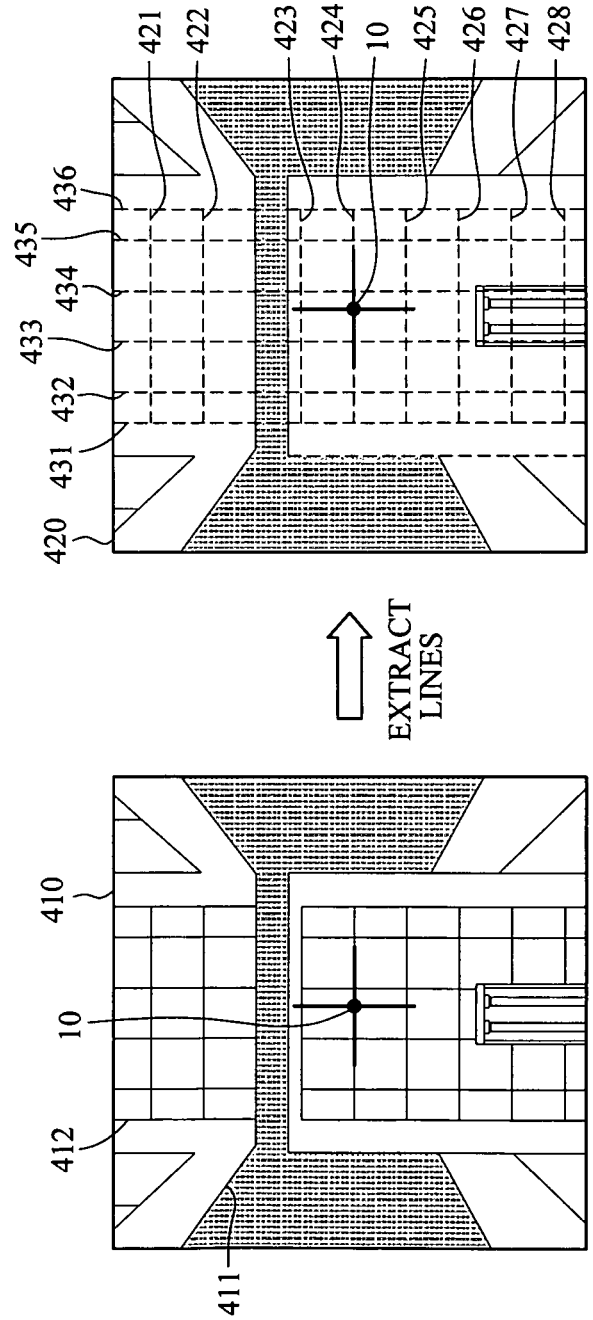
FIG. 4 is a diagram illustrating an extracting of a pattern and a pattern direction, according to one or more embodiments.

FIG. 4 illustrates an extracting of a pattern and a pattern direction, according to one or more embodiments. FIG. 4 shows how a pattern direction may be extracted when a pattern is a line, according to one or more embodiments. From the obtained left illustrated ceiling image 410, an optical center area 10 including an optical center may be determined. A pattern in the form of lines, for example, a plurality of lines including lines 411 and 412, may be extracted from a left region of the left illustrated ceiling image 410.

Because the line 411 extends towards, but do not pass over the optical center, it may be determined that line 411 is not in the same plane as the ceiling. Thus, lines such as the line 411 which are determined as not being in the same plane as the ceiling may be disregarded.

Moreover, in case of extracting a plurality of lines which are in the same plane as the ceiling, lines that extend in the same direction may be grouped together, and a direction of a group including the most lines may be determined as a pattern direction.

As illustrated in FIG. 4, the right illustrated ceiling image 420 shows a result of an extracting of a pattern in the form of lines from the left illustrated ceiling image 410. Dotted lines of the ceiling image 420 are from a pattern extracted from the left illustrated ceiling image 410. In an embodiment, for example, the pattern direction may be determined to be in the same direction as the direction of lines 421, 422, 423, 424, 425, 426, 427, and 428 which are parallel to the ceiling, and most common.

In addition, lines 431, 432, 433, 434, 435, and 436 which are perpendicular to the lines 421, 422, 423, 424, 425, 426, 427, and 428 may be extracted. A direction of the lines 431, 432, 433, 434, 435, and 436 may be determined to be the perpendicular pattern direction, i.e., at a right angle to the pattern direction. The pattern direction and the perpendicular pattern direction may further be determined using various clustering methods.

As such, in response to a determination of the pattern direction and the perpendicular pattern direction, the mobile robot 100 may set a direction of a traveling path to be identical to the pattern direction or the perpendicular pattern direction, and move along the set direction of a traveling path.

Figure 5:
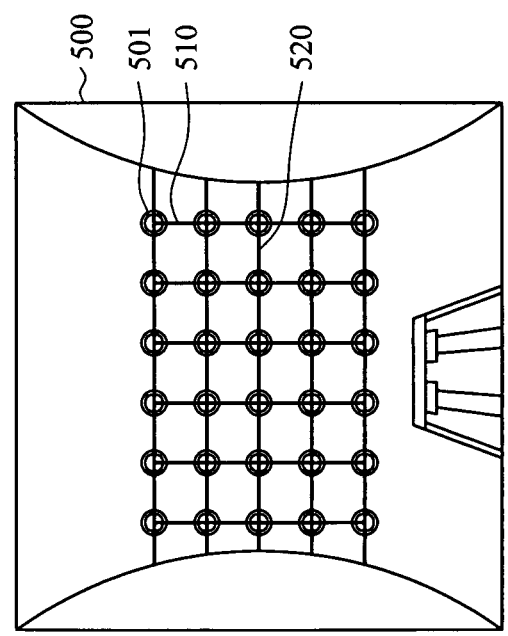
FIG. 5 is a diagram illustrating an extracting of a pattern and a pattern direction, according to one or more embodiments.

FIG. 5 illustrates another extracting of a pattern and a pattern direction, according to one or more embodiments. The example illustrated in FIG. 5 shows how to extract a pattern direction when a plurality of repeated patterns are extracted from a ceiling image.

As described above with reference to FIG. 3, the pattern extracting unit 310 may extract a repeated pattern from a ceiling image. It may be determined whether the patterns are repeated patterns by comparing the similarity between local images for feature points extracted from the ceiling image. The similarity between the local images for the feature points may be calculated based on normalized cross correlation (NCC), sum of squared differences (SSD), sum of absolute differences (SAD), mean of absolute differences (MAD), or the like, noting that alternative similarity determination schemes are equally available.

Referring to FIG. 5, when circular patterns such as circles 501 are repeatedly extracted from a ceiling image 500, line patterns 510 and 520, each of which is extrapolated between the repeated circular patterns, may also be extracted. A direction having the most line patterns 510 may be determined to be a pattern direction. Additionally, a direction of the line patterns 520, which is at a right angle to the direction of the line patterns 510, may be determined as a perpendicular pattern direction. In response to determining the pattern direction and the perpendicular pattern direction in the ceiling image 500, the mobile robot 100 may set a direction of a traveling path to be identical with the pattern direction or the perpendicular pattern direction, and move along the set direction of a traveling path.

FIG. 6 illustrates a flowchart of a method planning a traveling path, according to one or more embodiments.

At least one of select patterns may be extracted from a ceiling image captured from a space where a mobile robot moves along by photographing its surroundings in the ceiling direction, in operation 610.

The at least one pattern direction may then be extracted in the form of a line from the extracted pattern, in operation 620.

When the select pattern is a line and a plurality of lines are extracted from the ceiling image, lines which do not appear to be in the same plane as the ceiling may not be considered in determining a pattern direction of the ceiling, such that a direction of lines which appear to be in the same plane as the ceiling can be extracted as the pattern direction. In one or more embodiments, from among the extracted lines, lines that extend to, but do not pass over an optical center may be determined to not be in the same plane as the ceiling.

When a plurality of extracted lines appear to be in the same plane as the ceiling, the extracted lines extending in a same direction may be grouped together, and a direction representing the most common lines of all groups may be determined to be the pattern direction. When a plurality of repeated patterns, which are not lines, are extracted from the ceiling image, a direction of an extrapolated line pattern formed by the repeated patterns may be determined to be the pattern direction.

The pattern direction may then be used to generate a traveling path, in operation 630. Alternatively, a perpendicular pattern direction, perpendicular to the pattern direction, may be used to generate the traveling path. Position information of the mobile robot may be used to generate a first traveling path, compare a direction of the first traveling path with the extracted pattern direction, and adjust the first traveling path by changing the direction of the first traveling path to be the same as the extracted pattern direction.

In one or more embodiments, apparatus, system, and unit descriptions herein include one or more hardware processing elements. For example, each described unit may include one or more processing elements performing the described operation, desirable memory, and any desired hardware input/output transmission devices. Further, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), which executes (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus planning a traveling path of a mobile robot, the apparatus comprising:
   a pattern extracting unit to extract patterns from an image of a ceiling captured in a ceiling direction, wherein the extracted patterns correspond to structural or decorative features of the ceiling which are not artificial location marks having pre-stored location coordinates, and an extracted pattern is an extracted line, extracted circular object, and/or extracted quadrangle;
   a pattern direction extracting unit to extract a pattern direction of the extracted patterns in the image by grouping the extracted patterns according to a determined same direction, when the extracted patterns are extracted lines, and according to a determined repetition direction, when the extracted patterns are determined same extracted circular objects or determined same quadrangles, so as to determine the pattern direction to be the determined same direction of the extracted lines or the determined repetition direction of the circular objects or quadrangles; and
   a path generating unit to generate a traveling path of the mobile robot based on the extracted pattern direction.

2. The apparatus of claim 1, wherein the pattern direction of the image is a straight line.

3. The apparatus of claim 1, wherein, when the at least one pattern includes a line and a plurality of lines are extracted, the pattern direction extracting unit disregards extracted lines, of the plurality of extracted lines, that are determined to not appear to be in a determined same plane as the ceiling, from consideration for the extraction of the pattern direction of the image, and extracts a direction from extracted lines, of the plurality of extracted lines, that are determined to appear to be in the determined same plane as the ceiling, as the pattern direction.

4. The apparatus of claim 3, wherein the pattern direction extracting unit determines an extracted line that extends to but does not pass over a predetermined optical center area to be a line that does not appear to be in the determined same plane as the ceiling.

5. The apparatus of claim 3, wherein, upon a determination that a plurality of extracted lines appear to be in the determined same plane as the ceiling, the pattern direction extracting unit respectively groups together extracted lines arranged in same directions and extracts a direction of a group including a greatest number of extracted lines as the pattern direction.

6. The apparatus of claim 3, wherein the path generating unit generates a first traveling path using position information of the mobile robot, and adjusts the generated first traveling path by changing the direction of the first traveling path to be identical to the pattern direction when a direction of the first traveling path is determined to not be identical to the extracted pattern direction.

7. The apparatus of claim 3, wherein the pattern direction extracting unit further extracts a perpendicular pattern direction which is perpendicular to the pattern direction, and the path generating unit uses at least one of the pattern direction and the perpendicular pattern direction to generate the traveling path.

8. The apparatus of claim 3, wherein the path generating unit generates a zigzag path including a first traveling path in a first direction and a second traveling path in a second direction such that the first direction or the second direction is parallel to the extracted pattern direction and when the mobile robot moves along the zigzag path, the mobile robot moves along the first traveling path in the first direction until encountering an obstacle, changes direction and moves a predetermined distance relative to the obstacle, then changes direction to the second traveling direction which is opposite to the first traveling direction and moves in the second traveling direction until encountering another obstacle.

9. The apparatus of claim 1, wherein the pattern extracting unit extracts a plurality of repeated patterns from the ceiling image and the pattern direction extracting unit extracts a direction of a line extrapolated from the repeated patterns as the pattern direction.

10. The apparatus of claim 9, wherein the extracted repeated patterns are determined same extracted circular objects or determined same quadrangles, and are determined based upon the pattern extracting unit respectively extracting the same extracted circular objects or the same quadrangles using a feature point extraction algorithm based on analyzing the image for feature descriptors, the feature descriptors representing a particular local image.

11. The apparatus of claim 10, wherein the feature point extraction algorithm based on the particular local image is a scale-invariant feature transform scheme.

12. The apparatus of claim 1, wherein the path generating unit generates a first traveling path using position information of the mobile robot, and adjusts the generated first traveling path by changing the direction of the first traveling path to be identical to the pattern direction when a direction of the first traveling path is determined to not be identical to the extracted pattern direction.

13. The apparatus of claim 1, wherein the pattern direction extracting unit further extracts a perpendicular pattern direction which is perpendicular to the pattern direction, and the path generating unit uses at least one of the pattern direction and the perpendicular pattern direction to generate the traveling path.

14. The apparatus of claim 1, wherein the path generating unit generates a zigzag path including a first traveling path in a first direction and a second traveling path in a second direction such that the first direction or the second direction is parallel to the extracted pattern direction and when the mobile robot moves along the zigzag path, the mobile robot moves along the first traveling path in the first direction until encountering an obstacle, changes direction and moves a predetermined distance relative to the obstacle, then changes direction to the second traveling direction which is opposite to the first traveling direction and moves in the second traveling direction until encountering another obstacle.

15. The apparatus of claim 1, wherein the same extracted circular objects or same quadrangles are determined based upon the pattern extracting unit respectively extracting the same extracted circular objects or the same quadrangles using a feature point extraction algorithm based on analyzing the image for feature descriptors, the feature descriptors representing a particular local image.

16. The apparatus of claim 15, wherein the feature point extraction algorithm based on based on the particular local image is a scale-invariant feature transform scheme.

17. The apparatus of claim 1,
wherein the pattern direction extracting unit extracts the pattern direction of the image to be a direction of the plural extracted patterns that are determined to be in a determined same plane as the ceiling, and
wherein the pattern direction extracting includes determining lines, for the plural extracted patterns, that extend to but do not pass over a predetermined optical center area to represent extracted patterns that are not in the determined same plane as the ceiling.

18. A method planning a traveling path of a mobile robot, the method comprising:
extracting at least one pattern from an image of a ceiling captured in a ceiling direction;
extracting a pattern direction of the image in the form of a line from the at least one extracted pattern; and
generating a traveling path of the mobile robot based on the extracted pattern direction,
wherein, when the pattern is a line and a plurality of lines are extracted, the extracting of the pattern direction includes disregarding of extracted lines, of the plurality of extracted lines, that are determined to not appear to be in a determined same plane as the ceiling, from consideration for the extraction of the pattern direction of the image, and extracting a direction from extracted lines, of the plurality of extracted lines, that appear to be in the determined same plane as the ceiling, as the pattern direction.

19. The method of claim 18, wherein the extracting of the pattern direction further includes determining an extracted line that extends to but does not pass over a predetermined optical center area to be a line that does not appear to be in the determined same plane as the ceiling.

20. The method of claim 18, wherein, upon a determination that a plurality of extracted lines appear to be in the determined same plane as the ceiling, the extracting of the pattern direction includes respectively grouping together extracted lines arranged in same directions and extracting a direction of a group including a greatest number of extracted lines as the pattern direction.

21. The method of claim 18, wherein the extracting of the pattern includes extracting a plurality of repeated patterns from the ceiling image and the extracting of the pattern direction includes extracting a direction of a line pattern extrapolated from the repeated patterns as the pattern direction.

22. The method of claim 21, wherein the extracted repeated patterns are determined same extracted circular objects or determined same quadrangles, and are determined based upon the pattern extracting unit respectively extracting the same extracted circular objects and the same quadrangles using a feature point extraction algorithm based on analyzing the image for feature descriptors, the feature descriptors representing a particular local image.

23. The method of claim 22, wherein the feature point extraction algorithm based on the particular local image is a scale-invariant feature transform scheme.

24. The method of claim 18, wherein the generating of the traveling path includes
estimating position information of the mobile robot and generating a first traveling path using the estimated position information,
determining whether a direction of the first traveling path is identical to the extracted pattern direction, and
adjusting the first traveling path by changing the direction of the first traveling path to be identical to the pattern direction when the determining indicates that the first traveling path is not identical to the extracted pattern direction.

25. The method of claim 18, wherein the extracting of the pattern direction further includes determining a perpendicular pattern direction perpendicular to the pattern direction and the generating of the traveling path further includes generating the traveling path using at least one of the pattern direction and the perpendicular pattern direction.

26. The method of claim 18, wherein the generating of the traveling path includes generating a zigzag path, which includes a first traveling path in a first direction and a second traveling path in a second direction, such that the first direction or the second direction is parallel to the extracted pattern direction and when the mobile robot moves along the zigzag path, the mobile robot moves along the first traveling path in the first direction until encountering an obstacle, changes direction and moves a predetermined distance relative to the obstacle, then changes direction to the second traveling direction which is opposite to the first traveling direction and moves in the second traveling direction until encountering another obstacle.

27. An apparatus planning a traveling path of a mobile robot, the apparatus comprising:

a pattern extracting unit to extract plural patterns from an image of a ceiling captured in a ceiling direction, each of the plural patterns being an extracted line;

a pattern direction extracting unit to extract a pattern direction of the image as a direction of one of the plural extracted lines determined to be in a determined same plane as the ceiling; and a path generating unit to generate a traveling path of the mobile robot based on the extracted pattern direction, wherein the pattern direction extracting unit determines lines, of the plural extracted lines, that extend to but do not pass over a predetermined optical center area to be extracted lines that are not in the determined same plane as the ceiling.

28. A method planning a traveling path of a mobile robot, the method comprising:

extracting plural patterns from an image of a ceiling captured in a ceiling direction, each of the plural patterns being an extracted line;

extracting a pattern direction of the image as a direction of one of the plural extracted lines determined to be in a determined same plane as the ceiling; and generating a traveling path of the mobile robot based on the extracted pattern direction, wherein the pattern direction extracting includes determining lines, of the plural extracted lines, that extend to but do not pass over a predetermined optical center area to be extracted lines that are not in the determined same plane as the ceiling.

* * * * *